Feb. 25, 1969 R. S. BADESSA 3,430,151
AMPLITUDE MODULATION DETECTOR FOR SINGLE SIDEBAND OR SUPPRESSED CARRIER INPUT
Filed Sept. 7, 1966

INVENTOR
ROSARIO S. BADESSA
BY, Edward D Thomas
AGENT 3,430,151

AMPLITUDE MODULATION DETECTOR FOR SINGLE SIDEBAND OR SUPPRESSED CARRIER INPUT

Rosario S. Badessa, West Roxbury, Mass., assignor to Massachusetts Institute of Technology, Cambridge, Mass., a corporation of Massachusetts Filed Sept. 7, 1966, Ser. No. 577,763
U.S. Cl. 329—50 8 Claims
Int. Cl. H03d *5/00*; H03k *9/06*

The present invention is related to a detector circuit for use with amplitude modulated and single sideband communication systems and more particularly to a demodulator for a suppressed carrier system.

Suppressed carrier communication systems have long been known to possess certain advantages with respect to power savings, simplicity, and resistance to jamming. Yet suppressed carrier systems are greatly handicapped by the complexity of the circuitry proposed by the prior art for demodulation. Certain prior art schemes have demanded the transmission of a small amount of carrier to synchronize the locally generated synchronous reference. Some have made use of a servoloop method to establish and maintain synchronism. Others have relied on harmonic generation to provide a locking signal for a local oscillator at the carrier frequency. Of the prior art schemes capable of demodulation when the signal has no carrier, all of necessity depend upon non-linear operations in the receiver to supply this missing carrier. The effect of these non-linear operations upon signals having moderate amounts of system noise within the useful passband is to deteriorate the quality of the locally generated carrier to such a degree that these systems become ineffective at signal-to-noise ratios for which conventional forms of transmission function with ease.

It is an object of the present invention to provide a detection system for suppressed carrier waves that is simple in construction and operation and which minimizes the undesirable intermodulation effects normally associated with the performance of a non-linear operation on a noisy signal.

The present invention allows the use of two sidebands equally and permits several embodiments of which the simplest is a passive demodulator which uses no source of power other than the signal itself. Although passive, a stable reference signal is synthesized from the waveform of the incoming signal without recourse to servo loops or to harmonic generation. This synthesized reference permits the circuit to function as a synchronous detector for suppressed carrier and amplitude modulated waves and as a balanced or product detector for single sideband waves. Consequently, the present invention permits reception of a variety of forms of transmission, without switching, by merely tuning the receiver over its band. In addition to possession the advantages inherent in the process of detection of signals synchronously, the circuit possesses an unusual immunity to impulse-noise interference.

The above-mentioned and other features and objects of the invention with become more apparent from the following description and accompanying drawing in which.

Figure 1:
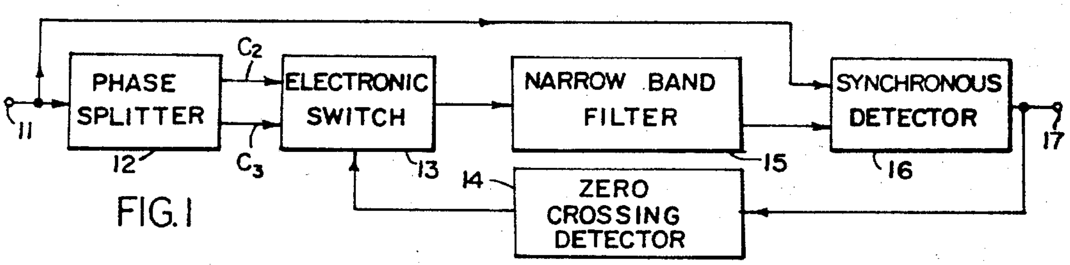
FIG. 1 is a block diagram illustrating the waveform synthesis process of this invention.
Figure 2:
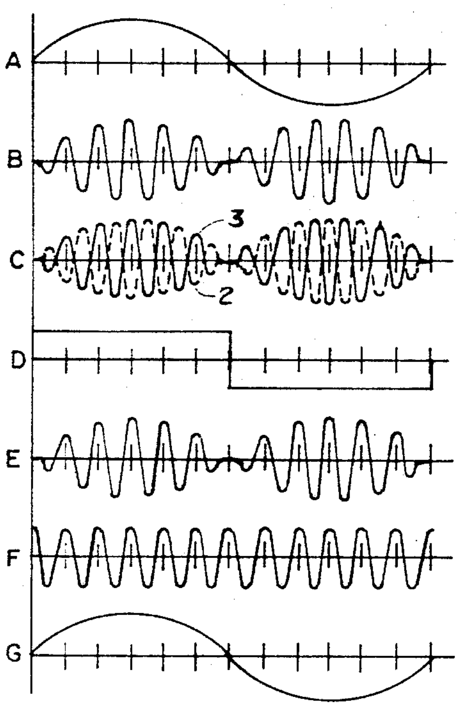
FIG. 2 is a graph of the waveforms of the signals occurring at various steps in the synthesis process.

With reference to FIG. 1 and the waveforms of FIG. 2, the input signal to the device is applied to terminal 11 and represents a received signal such as might be obtained at the output of the intermediate frequency amplifier of a superheterodyne receiver. If the received signal is a suppressed carrier wave and is modulated with the sine wave shown in FIG. 2A, it will present the appearance shown in FIG. 2B. It will be noticed that the envelope of waveform 2B follows the magnitude of the sine wave 2A and that the radio frequency under the envelope of 2B assumes either of two phases, 180 degrees apart, depending upon whether the waveform 2A is in the positive or negative part of its cycle. The abrupt change in the phase of the radio frequency at the moment that waveform 2A changes polarity is indicated in FIG. 2B by the time markers which, during the first half cycle of the modulation, coincide with the positive peaks, and, during the last half of the modulation cycle, coincide with the negative peaks. It is typical of a suppressed carrier wave that for purposes of detection either of these two phases may be assumed to represent the phase of the missing carrier. So for purposes of explanation it will be assumed that the positive peaks of the radio frequency wave representing the carrier would, if it were present, always fall on the time markers, in much the same manner as the signal during the positive half cycle of the modulation. The suppressed carrier input signal at 11. is fed to phase splitter 12, the output of which consists of two identical waves, but of opposite polarity. In FIG. 2C waveforms 2 and 3 represent outputs C2 and C3 respectively of phase splitter 12. Waveform 2 is shown dotted for clarity.

It will be noticed from FIG. 2C that at any given moment one of the outputs of the phase splitter 12 has a phase corresponding to that of the original carrier. For example, during the first half cycle of waveform A of FIG. 2, output 3 has the proper phase whereas during the second half cycle output 2 has the proper phase. By selecting whichever of these two waveforms has the proper phase at any given moment, a waveform can be synthesized that is always in phase with the missing carrier. The function of electronic switch 13 is to make this selection between waveforms C2 and C3. For the moment, we shall assume that the proper trigger pulse is available to operate the switch. Clearly, the electronic switch must change position whenever there is a change in the polarity of the modulation waveform of FIG. 2A. It will later be shown how the trigger pulse is actually obtained. The waveform of FIG. 2E illustrates the output of electronic switch 13 and differs from the original input wave form of FIG. 2B in one important respect, namely in that the positive peaks of the radio frequency under the envelope are at all times coincident with the time markers. Since the phase of waveform 2E is continuous, a carrier exists. This carrier is extracted by applying the output of electronic switch 13 to the narrow band filter 15 which is centered at the carrier frequency $f_0$ and is designed to have a bandwidth sufficiently narrow to reject a predominant amount of the accompanying sidebands. In practice this bandwidth is typically 200 c.p.s. and can be obtained conveniently by use of a crystal filter. However, any form of filtering can be used that effectively separates the carrier from its accompanying sidebands.

Waveform F. of FIG. 2 represents the output of filter 15 and is the desired carrier. It is used as the reference input to synchronous detector 16 while the original input waveform 11 is used as the second input to 16. The small residual amplitude fluctuations on waveform F are effectively limited by the synchronous detector insensitivity to moderate changes of reference level. The output terminal 17 of synchronous detector 16 supplies the useful demodulated output of the system as shown in FIG. 2G, which is substantially undistorted replica of the modulation shown in FIG. 2A. The output of synchronous detector 16 is also fed to the input of zero crossing detector 14. The function of zero crossing detector 14 is to supply to electronic switch 13 a trigger signal of the proper polarity to select the required phase splitter channel. For example, during the first half cycle of the modulation signal of FIG. 2A, the electronic switch selects C3. It does so because it receives a positive output from the zero crossing detector. The output of the zero crossing detector is shown in FIG. 2D, and is seen to be a highly clipped version of waveform G. During the second half cycle of the modulation signal of FIG. 2A, the polarity supplied by the zero crossing detector is negative and the electronic swtch selects C2.

The principle of the present invention can be expressed very briefly as follows:

An electronic switch removes the 180 degree reversals of phase characteristic of the radio frequency under the envelope of a suppressed carrier wave by inverting the polarity of the wave at the precise moment that the phase would normally undergo these reversals. The reconstructed carrier so obtained is filtered and used to demodulate synchronously the original input signal to obtain thereby the information needed to operate the electronic switch.

Figure 3:
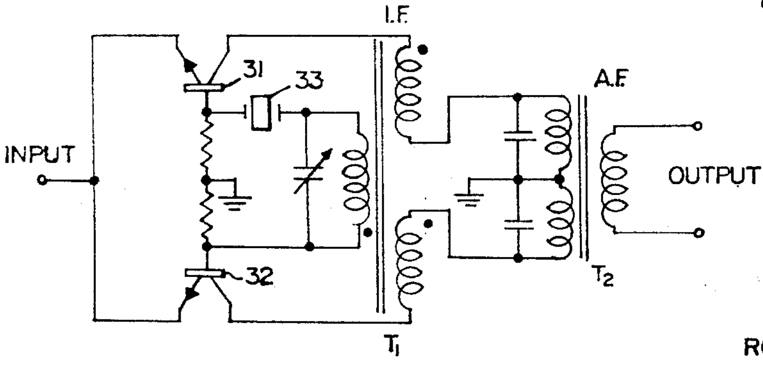
FIG. 3 is a schematic diagram of a particular embodiment of the synthesis process illustrated in FIG. 1.

A preferred embodiment of the invention is shown in the schematic diagram of FIG. 3. In normal use the circuit as shown would be driven by the output of a receiver's intermediate frequency amplifier and the crystal 33 would have a resonance frequency $f_0$ at the approximate center of the *i-f* passband.

Let us assume, for purposes of explanation, that transistor 32 has been removed from its socket and that an unmodulated carrier of frequency $f_0$ has been applied to the detector input. Since no voltage exists initially at the output of the crystal filter, the base of transistor 31 is at the same potential as its collector. It therefore acts as a diode and begins to rectify the input signal. Since the collector current waveform contains a strong fundamental component of frequency $f_0$, this fundamental will be filtered out by the crystal and returned to the transistor base at the proper phase to prevent interference with the rectification process. It will be noticed, however, that the base of transistor 32 would be receiving a voltage 180 degrees out of phase with that on the base of transistor 31 were it in its socket. Thus it could not conduct even if it were present, so it can now be put back without disturbing the rectification process of transistor 31. Because of the symmetry of the circuit it is clear that on application of the input signal it is a matter of chance which transistor assumes the non-conducting role, but once it is off, a transistor will remain so indefinitely provided the input is not distributed. Suppose now that the unmodulated carrier which we are applying to the detector is given a sudden 180 degree reversal of phase and maintained at this new phase. Because of energy storage in the crystal, the phase of the voltages being applied to the transistor bases cannot undergo any sudden change. As a result, their relationship to the phase of the input signal will require that they swap roles. The transistor that was conducting shuts off and the previously non-conducting one starts rectifying. This transfer is so rapid that the energy flow to the crystal is not disturbed. It will be noticed that the sense of the primary windings of transformer T1 prevents any change from occurring in the phase of the voltage on the secondary.

The manner in which the present embodiment is able to demodulate a suppressed carrier wave can be seen by extension of the effect of applying an unmodulated carrier that was just described. The rectification done by the "on" transistor causes an average current to flow to ground through one half of the primary of the audio transformer T2. Since this current is proportional to the amplitude of the applied R–F signal, a voltage will appear at the secondary that is also proportional to this amplitude. As seen in FIG. 2, waverform B, a suppressed carrier wave is characterized by a sudden change of 180 degrees in the phase of the R–F under its envelope at the moment that the original modulating signal undergoes a change of polarity. But since, as we have seen, such sudden reversals of phase cause the nonconducting transistor to assume the conducting role, the rectified current will transfer to the opposite half of the audio transformer primary to reconstruction the polarity reversal present in the original audio.

The circuit of FIG. 3 functions best when driven by a current source. If the peak currents supplied by an input suppressed carrier wave reach 10 milliamperes, the fidelity with speech is found to be comparable to that of conventional amplitude modulation detectors. A typical avarage current is one milliampere.

The center frequency of a double sideband suppressed carrier wave must fall within the crystal passband for proper operation. When the receiver is tuned to such a wave, the proper setting occurs abruptly and is unmistakeable. Since peak currents of 10 milliamperes are necessary for good fidelity, it is sometimes desirable to furnish a continuous D.C. bias current slightly below 10 milliamperes. Even weak inputs to the detector can then be accepted with low distortion.

A conventional amplitude modulated signal does not contain the sudden 180 degree reversal of phase characteristic of a suppressed carrier wave, so when such a signal is applied to the circuit of FIG. 3 one transistor stays off at all times and the rectified current of the other flows to ground through one half of the audio transformer primary without interruption. Since this current is modulated, however, the audio signal will appear at the transformer secondary as before.

Consider what happens when an unmodulated carrier having a frequency $(f_0+\Delta)$ that falls *outside* the crystal passband is applied to the circuit of FIG. 3. Let us assume, for purposes of explanation, that the crystal has been removed from its socket and that the transistor bases are driven 180 degrees out of phase with each other by an external reference generator of frequency $f_0$. Unlike the case of the suppressed carrier signal previously described, the phase of the input signal with respect to this reference does not snap between 0 degrees and 180 degrees, since it is the phase of a vector rotating uniformly at a rate $\Delta$. The transfer between 0 degrees and 180 degrees does occur, however, though in a continuous manner. The role swapping operation of the transistors is correspondingly less abrupt and more in the nature of a continuous shifting of the rectification burden from one to the other. For example, when the phase between the signal vector and the reference is 0 degrees, transistor 31 does the rectifying and transistor 32 is off. When the phase falls in the first quadrant both transistors rectify, but transistor 31 rectifies for the major portion of the R-F cycle. When the phase is 90 degrees both transistors rectify equally. When the phase falls in the second quadrant both transistors rectify, but transistor 32 rectifies for the major portion of the R-F cycle, etc. Because of the sense of the primary winding of T1, the effect of the changing transistor conduction roles is such as to prevent the phase of the R-F induced in the secondary of T1 from making any net advance or retardation with respect to the phase of the reference. In a manner of speaking, the input signal vector is diametrically reversed whenever it begins to enter the second quadrant from the first or the third quadrant from the fourth. Hence the average frequency of the waveform on the secondary of T1 is the same as that of the assumed reference, $f_0$. The external reference source can now be removed and the crystal replaced. The circuit of FIG. 3 will continue to generate the reference $f_0$ and will cause the difference frequency $\Delta$ to appear at the output. An extension of this argument can be made to show that a reference $f_0$ would have been generated if we had assumed that the input signal contained more than one frequency component, indeed ever if the input signal consisted of a band of random noise. Hence the circuit is capable of single sideband demodulation. The proper tuning of the receiver would be the one which makes the I-F signal appear to require a carrier of frequency $f_0$.

Since the circuit of FIG. 3 is perfectly symmetrical, the only thing that determines which transistor should be rectifying at any given moment is the phase of the reference fed back to the bases, with respect to the phase of the input signal. Thus if no reference were present (for example if we removed the crystal and provided no drive for the transistor bases) *both* transistors would rectify simultaneously and the bucking action resulting from having rectified current entering both sides of the audio transformer primary in equal amount would prevent any output from appearing at the secondary. Consider now what would happen under normal operating conditions if an impulse became superimposed on the signal. Because of the crystal inertia, the reference level required on the transistor bases for correct switching of such a large input would not appear immediately. For the moment, therefore, the impulse would be bucked out in a manner similar to the case where no reference exists. Because such an impulse is over in such a short time, a predominant amount of it can be rejected. Discrimination between interference and signal is possible here because of the great difference in their rates of change. Some prior art circuits have also utilized rate of change limiting for eliminating impulse noise interference. The present invention differs from these in that the reference representing the average signal level is derived by filtering in the narrow band a waveform from which the undesirable impulses *have already been removed.* Prior art circuits perform this filtering *before* the impulse has been removed. Hence, prior art circuits are ineffective in removing a small impulse that follows quickly behind a large one. The embodiment of FIG. 3 not only avoids this difficulty, but retains its impulse noise immunity property regardless of the type of transmission being received.

Figure 4:
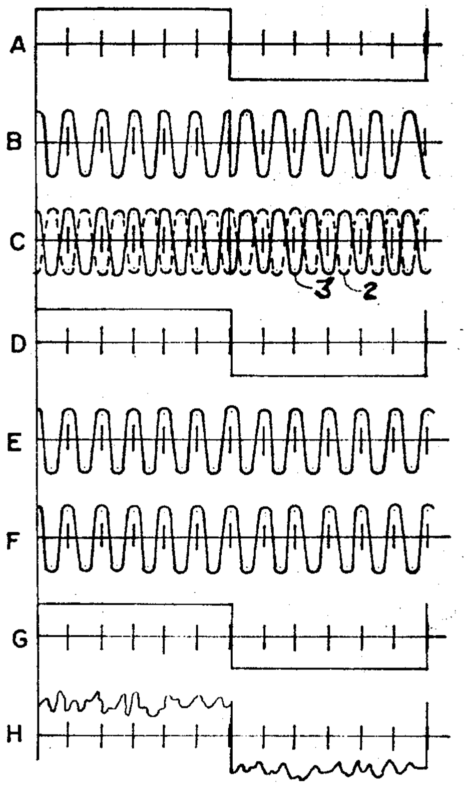
FIG. 4 is a graph of the waveforms of the signals occurring at various steps for square wave modulation.

In FIG. 4 are shown the waveforms that appear at various points of the block diagram of FIG. 1 when the input signal at terminal 11 is a suppressed carrier modulated with a square wave. Waveform A represents the modulation signal. Waveform B represents the suppressed carrier signal applied to terminal 11. Waveform C represents the outputs C2 and C3 of the phase splitter. Waveform D represents the output of the zero crossing detector 14. Waveform E represents the output of electronic switch 13. Waveform F represents the output of the narrow band filter and waveform G represents the output of the synchronous detector 16.

It is of interest to determine the effect of adding a small amount of random noise to the input signal at terminal 11. It will be assumed that this random noise has a level approaching that of the signal, but not of sufficient level to exceed the signal peaks to any significant extent. Because of the linearity of synchronous detector 16, its output will consist of a superposition of the effects of the signal and noise as shown in FIG. 4H. However, the output of the zero crossing detector will not be changed and will still have the appearance shown in FIG. 4D since, as can be seen in FIG. 4H, the noise is not of sufficient magnitude to affect the zeros. Thus electronic switch 13 will not be affected by the presence of the noise. It follows that the quality of the reference derived from the supressed carrier signal and appearing at the output of narrow band filter 15 will likewise not be affected. It is true that some noise may pass through the narrow band filter, but this is the normal result of superimposing signal and noise. Lacking is the deterioration of the process of carrier synthesis as a result of cross product or *intermodulation* between signal and noise.

If random noise had been added to a suppressed carrier signal having sinusoidal modulation, the electronic switch would have been affected the most during that part of the modulation cycle when the amplitude of the radio frequency is near zero. However, this is also the part of the modulation cycle where an error in the electronic switch position is least detrimental. Even for extremely poor signal-to-noise ratios the present invention continues to generate a stable reference for efficient synchronous detection, but the allowable tolerance in the receiver mistuning will eventually become too small to be useful.

What is claimed is:

1. A demodulator circuit for any amplitude modulation system of electrical communication in which the electrical wave to be demodulated is formed by the amplitude modulation of a carrier frequency wave with a signal frequency wave comprising:

(a) a source of electrical amplitude modulation input waves, (b) a pair of channels responsive to said input wave source to provide a pair of output waves differing in phase by 180 degrees, (c) electronic switching means for selecting the channel output wave having a given phase of said pair of output waves, (d) a narrow pass band filter having the center frequency of its pass band at the frequency of said carrier wave and responsive to said selected output wave to synthesize a local reference carrier wave, (e) a synchronous detector responsive to said local reference carrier wave and said input wave to recover said modulating signal wave, and (f) means for biasing said electronic switching means to apply said selected phase of input wave to said filter for the time interval during which said input wave possesses said given phase and upon phase reversal of said input wave to select the output of said second channel for application to said filter to maintain said local reference carrier wave in phase with the carrier frequency used in forming the input wave.

2. The demodulator circuit of claim 1 in which said amplitude modulation input wave is a suppressed carrier frequency modulation which comprises the upper and lower sidebands of the wave formed by the amplitude modulation of a carrier frequency wave with a signal frequency wave.

3. The demodulator circuit of claim 1 in which said amplitude modulation input wave comprises a sideband of the wave formed by the amplitude modulation of a carrier frequency wave with a signal frequency wave.

4. The demodulator circuit of claim 2 in which said electronic switching means includes an electronic switch in each of said channels, one of said switches being conductive and the second of said switches being nonconductive for said given phase of input signal waveform.

5. The demodulator circuit of claim 2 in which said narrow pass band filter includes a piezo electric crystal resonant at the suppressed carrier frequency.

6. The demodulator circuit of claim 5 in which said electronic switching means includes a transistor in each of said channels and in which the output of said crystal filter is applied to bias said transistor bases in phase opposition.

7. The demodulator circuit of claim 4 in which the means for biasing said electronic switches includes means responsive to the phase of said input wave with respect to the phase of the reference carrier wave to provide switching trigger pulses to said switches when said input wave changes phase with respect to said reference wave.

8. The demodulator circuit of claim 5 in which the energy storage of said narrow pass band filter prevents abrupt changes in the level of said input signal from affecting in a proportionate manner the level of the reference applied to said narrow pass band filter.

References Cited

UNITED STATES PATENTS

| | | | |
|---|---|---|---|
| 3,207,995 | 9/1965 | Beer et al. | 329—50 X |
| 3,265,976 | 8/1966 | Broadhead | 329—50 X |

ALFRED L. BRODY, *Primary Examiner.*

U.S. Cl. X.R.

178—5.4; 325—329, 330; 328—133; 332—43